(12) United States Patent
Kim

(10) Patent No.: US 8,532,432 B2  
(45) Date of Patent: Sep. 10, 2013

(54) MOBILE COMMUNICATION TERMINAL HAVING IMAGE CONVERSION FUNCTION AND METHOD

(75) Inventor: Dae-Yong Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 360 days.

(21) Appl. No.: 12/877,853

(22) Filed: Sep. 8, 2010

(65) Prior Publication Data

US 2011/0182470 A1    Jul. 28, 2011

(30) Foreign Application Priority Data

Jan. 28, 2010    (KR) .................. 10-2010-0008108

(51) Int. Cl.  
*G06K 9/36*    (2006.01)

(52) U.S. Cl.  
USPC ........................................... 382/285

(58) Field of Classification Search  
USPC ............... 345/422; 348/E13.002; 382/106, 382/277, 285  
See application file for complete search history.

(56) References Cited

U.S. PATENT DOCUMENTS

| | | | |
|---|---|---|---|
| 2008/0150945 | A1 | 6/2008 | Wang et al. |
| 2008/0239076 | A1* | 10/2008 | Luo .............................. 348/148 |

FOREIGN PATENT DOCUMENTS

| | | |
|---|---|---|
| JP | 2006-309626 | 11/2006 |
| JP | 2008-294785 | 12/2008 |
| KR | 10-2005-0001101 | 1/2005 |
| KR | 10-2008-0077391 | 8/2008 |

\* cited by examiner

*Primary Examiner* — Gregory F Cunningham  
(74) *Attorney, Agent, or Firm* — H.C. Park & Associates, PLC

(57) ABSTRACT

A mobile communication terminal having an image conversion function arranges and displays area-specific images in a three-dimensional (3D) space on the basis of distance information of the area-specific images of a two-dimensional (2D) image.

25 Claims, 4 Drawing Sheets

MOBILE COMMUNICATION TERMINAL HAVING IMAGE CONVERSION FUNCTION AND METHOD

CROSS REFERENCE TO RELATED APPLICATION

This application claims priority from and the benefit under 35 U.S.C. §119(a) of Korean Patent Application No. 10-2010-0008108, filed on Jan. 28, 2010, in the Korean Intellectual Property Office, the disclosure of which is incorporated herein by reference for all purposes.

BACKGROUND

1. Field

The following description relates to a mobile communication terminal having an image conversion function.

2. Discussion of the Background

Typically, a plurality of photographed two-dimensional (2D) images of an object taken from several angles is combined to generate a three-dimensional (3D). This method involves photographing the same object from several angles and thus is troublesome. Also, this method involves a complex calculation for combining and correcting the photographed images taken from the several angles, and thus takes a long time to execute.

SUMMARY

Exemplary embodiments of the present invention provide a mobile communication terminal having an image conversion function to convert a two-dimensional (2D) image into a three-dimensional (3D) image by arranging area-specific images obtained by dividing the 2D image in a 3D space on the basis of distance information of the area-specific images.

Additional features of the invention will be set forth in the description which follows, and in part will be apparent from the description, or may be learned by practice of the invention.

An exemplary embodiment provides a terminal including a coordinate selector to select two-dimensional (2D) coordinates from an image; an area divider to divide an area defined by the 2D coordinates selected by the coordinate selector; an image capturer to capture an area-specific image of the area divided by the area divider; a distance measurer to measure a distance of the area-specific image captured by the image capturer from the terminal; and an image processor to generate a three-dimensional (3D) space, and to arrange and to display the captured area-specific image in the 3D space on the basis of the distance obtained by the distance measurer.

An exemplary embodiment provides a method for image conversion including selecting two-dimensional (2D) coordinates from a 2D image; dividing an area defined by the 2D coordinates into an area-specific image; measuring a distance of the area-specific image; arranging the area-specific image in a three-dimensional (3D) space on the basis of the distance of the area-specific image; and displaying the arranged area-specific image on a screen.

An exemplary embodiment provides a method for image conversion including dividing a two-dimensional (2D) image into area-specific images; measuring a distance to an object in at least one of the area-specific images; and arranging the area-specific images in a three-dimensional (3D) space on the basis of the distance of the object in the at least one of the area-specific images.

It is to be understood that both the foregoing general description and the following detailed description are exemplary and explanatory and are intended to provide further explanation of the invention as claimed. Other features will become apparent to those skilled in the art from the following detailed description, which, taken in conjunction with the attached drawings, discloses exemplary embodiments of the invention.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
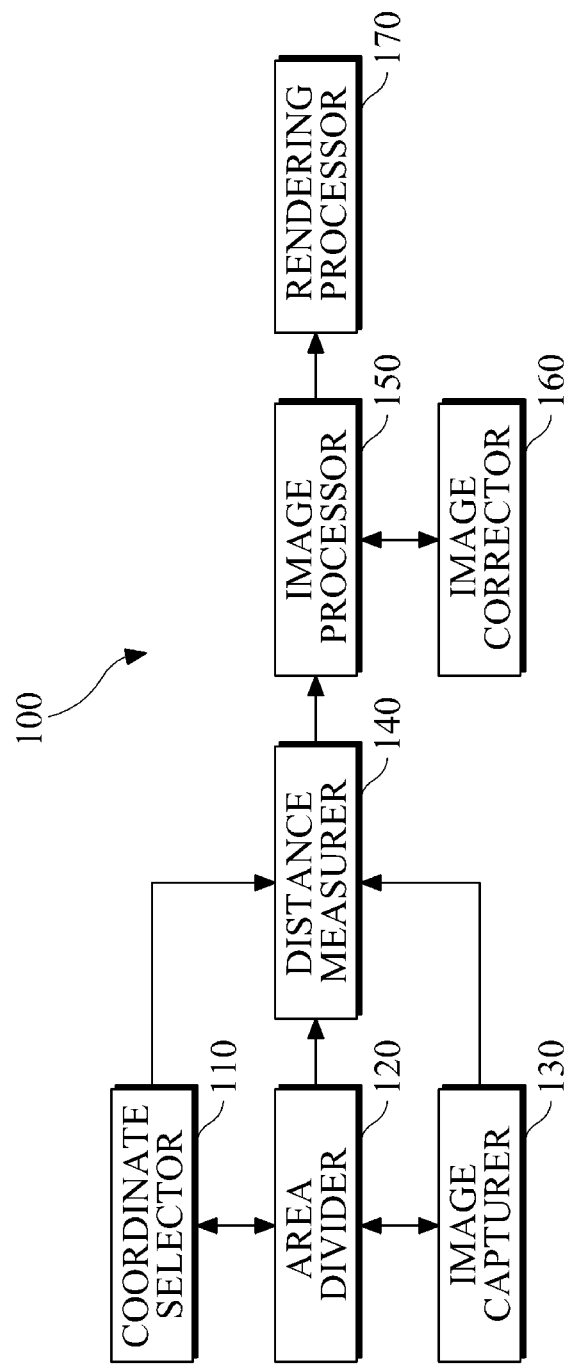
FIG. 1 is a block diagram of a terminal having an image conversion function according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. The phrase, "at least one of A, B, and C" may be satisfied by A only, B only, C only, or any partial or full combination of A, B, and C.

FIG. 1 is a block diagram of a terminal 100 having an image conversion function according to an exemplary embodiment. As shown in FIG. 1, a terminal 100 having an image conversion function includes a coordinate selector 110, an area divider 120, an image capturer 130, a distance measurer 140, and an image processor 150. The terminal 100 may be a mobile and/or communication terminal.

The terminal 100 having an image conversion function includes a camera (not shown) to capture and/or store images. As described herein, a captured image may be stored in a memory or not stored. If the terminal 100 enters an image conversion capturing mode by a user's manipulation, an image captured in real time by the camera is output on a screen (not shown) of the terminal 100.

The coordinate selector 110 selects two-dimensional (2D) coordinates from the real-time captured image.

The coordinate selector 110 may select 2D coordinates that are spaced apart from each other by a same distance in the horizontal and vertical directions from a point within the real-time captured image. The coordinate selector 110 may automatically select 2D coordinates at regular intervals in the horizontal and vertical directions from the point within the real-time captured image.

The coordinate selector 110 may select 2D coordinates selected by a user from the real-time captured image. If a user manually selects 2D coordinates by touching a desired position, etc. on a touch screen (not shown) on which the real-time captured image is displayed, the coordinate selector 110 may select the 2D coordinates selected by the user.

The coordinate selector 110 may recognize objects in the real-time captured image, and may select arbitrary 2D coordinates among 2D coordinates of an area including the recognized objects. The coordinate selector 110 may automatically recognize objects included in the real-time captured image, and may select arbitrary 2D coordinates in the area including the recognized objects, for example, 2D coordinates at each corner of a quadrangular area including the recognized objects.

However, aspects need not be limited thereto such that the coordinate selector 110 may select 2D coordinates using a combination, i.e., 2 or more, of the above-described methods.

The area divider 120 divides an area defined by 2D coordinates selected by the coordinate selector 110. The area divider 120 may divide the area into small areas of quadrangular shapes for image correction or the divided areas may have various shapes.

The image capturer 130 captures images of the respective areas divided by the area divider 120. The image capturer 130 may obtain the area-specific images by dividing a whole image captured at a time according to the respective small areas divided by the area divider 120, or may capture each of the area-specific images using a multi-focus method to maintain a resolution during three-dimensional (3D) arrangement or a zoom-in or zoom-out operation for the area-specific images, which will be described later.

For example, the image capturer 130 may focus on the center coordinates of each of the area-specific images divided by the area divider 120 to capture the area-specific image in the multi-focus method.

The distance measurer 140 measures or determines distances of the area-specific images captured by the image capturer 130. The area-specific images captured by the image capturer 130 and the distance information of the area-specific images obtained by the distance measurer 140 are stored in relation to each other.

The distance information obtained by the distance measurer 140 may be the distance information of center coordinates of the area-specific images, or the distance information of arbitrary coordinates included in the area-specific images.

The image processor 150 generates a 3D space, and arranges and displays the captured area-specific images in the 3D space on the basis of the distance information obtained by the distance measurer 140.

Figure 2:
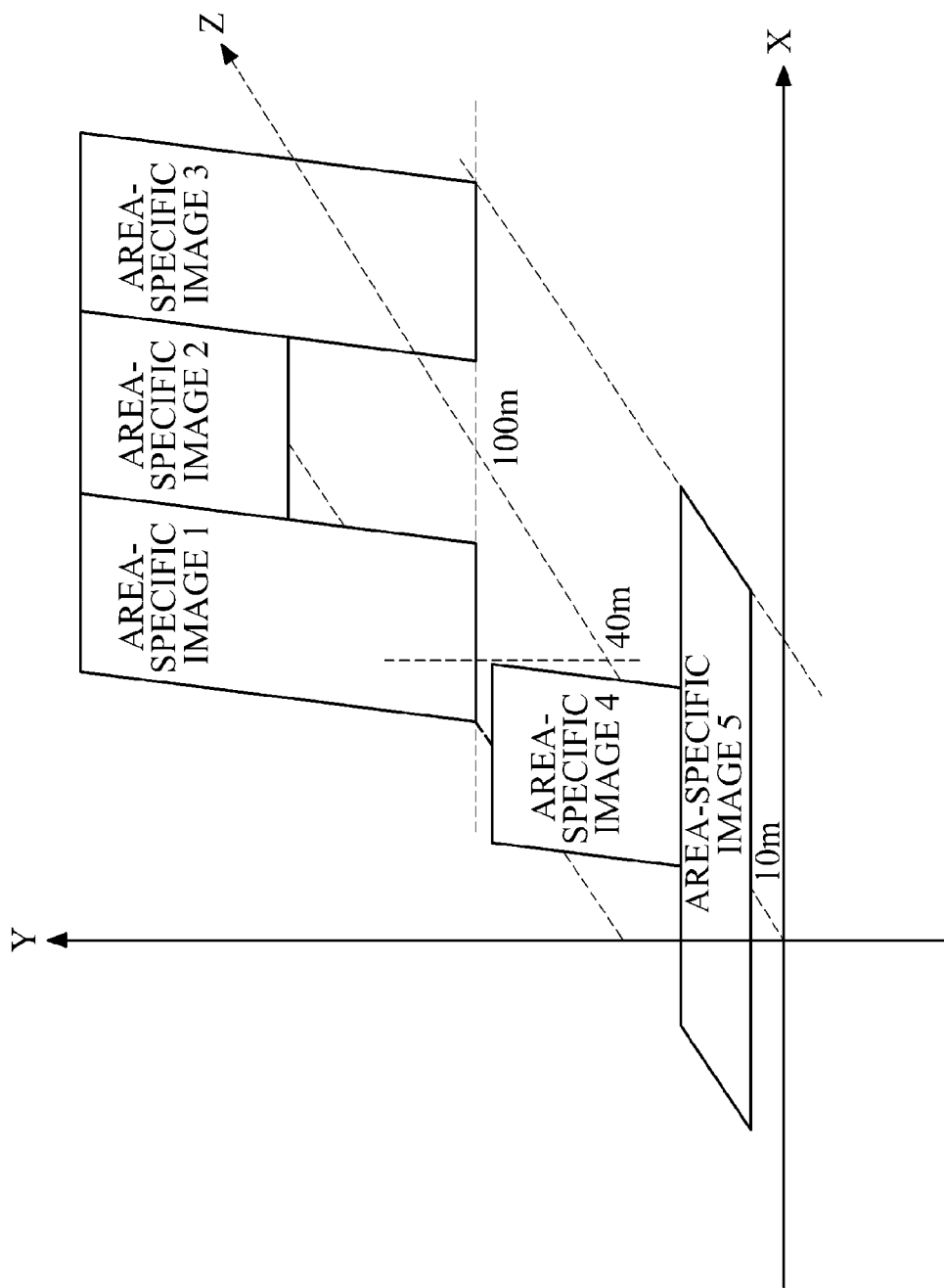
FIG. 2 illustrates an example of area-specific images arranged in a three-dimensional (3D) space.

As shown in FIG. 2, the image processor 150 modifies and arranges the area-specific images in the 3D space, in which a first axis denotes a horizontal axis X of the images, a second axis denotes a vertical axis Y of the images, and a third axis denotes a distance axis Z of the images, on the basis of the obtained distance information. The modification of the area-specific images may be at least one of enlargement, reduction, rotation, or bending.

FIG. 2 illustrates an example of area-specific images arranged in a three-dimensional (3D) space. Referring to FIG. 2, area-specific images 1, 2, 3, 4, and 5 are arranged according to distance in a 3D space.

If a specific distance is set as a reference distance and area-specific images corresponding to the reference distance are arranged in the 3D space, area-specific images at a closer distance than the reference distance may be enlarged and arranged in the 3D space, and area-specific images at a farther distance than the reference distance may be reduced and arranged in the 3D space.

If continuous area-specific images are at a similar distance, the images may be rotated or bent and arranged in the 3D space.

The terminal 100 having an image conversion function arranges and displays area-specific images in a 3D space on the basis of the distance information of the area-specific images by dividing a 2D image.

Referring to FIG. 1, the terminal 100 having an image conversion function may additionally include an image corrector 160. The image corrector 160 performs image correction for the boundaries of area-specific images arranged in a 3D space by the image processor 150.

The image corrector 160 may copy a part of images adjacent to blanks at the boundaries generated by arranging the area-specific images in the 3D space on the basis of distance information to fill the blanks, thereby correcting the images.

The image corrector 160 may copy a part of images symmetrical to blanks at the boundaries generated by arranging the area-specific images in the 3D space on the basis of distance information to fill the blanks, thereby correcting the images.

The image corrector 160 may enlarge area-specific images positioned in areas corresponding to blanks at the boundaries generated by arranging the area-specific images in the 3D space on the basis of distance information to fill the blanks, thereby correcting the images.

The image corrector 160 may search for images corresponding to global positioning system (GPS) information related to area-specific images, which correspond to blanks at the boundaries generated by arranging the area-specific images in the 3D space on the basis of distance information, from a server and may copy a part of the searched images to fill the blanks, thereby correcting the images.

The image corrector 160 may perform image correction for the boundaries of the area-specific images arranged in the 3D space using a combination, i.e., 2 or more, of the above-described methods.

Figure 3:
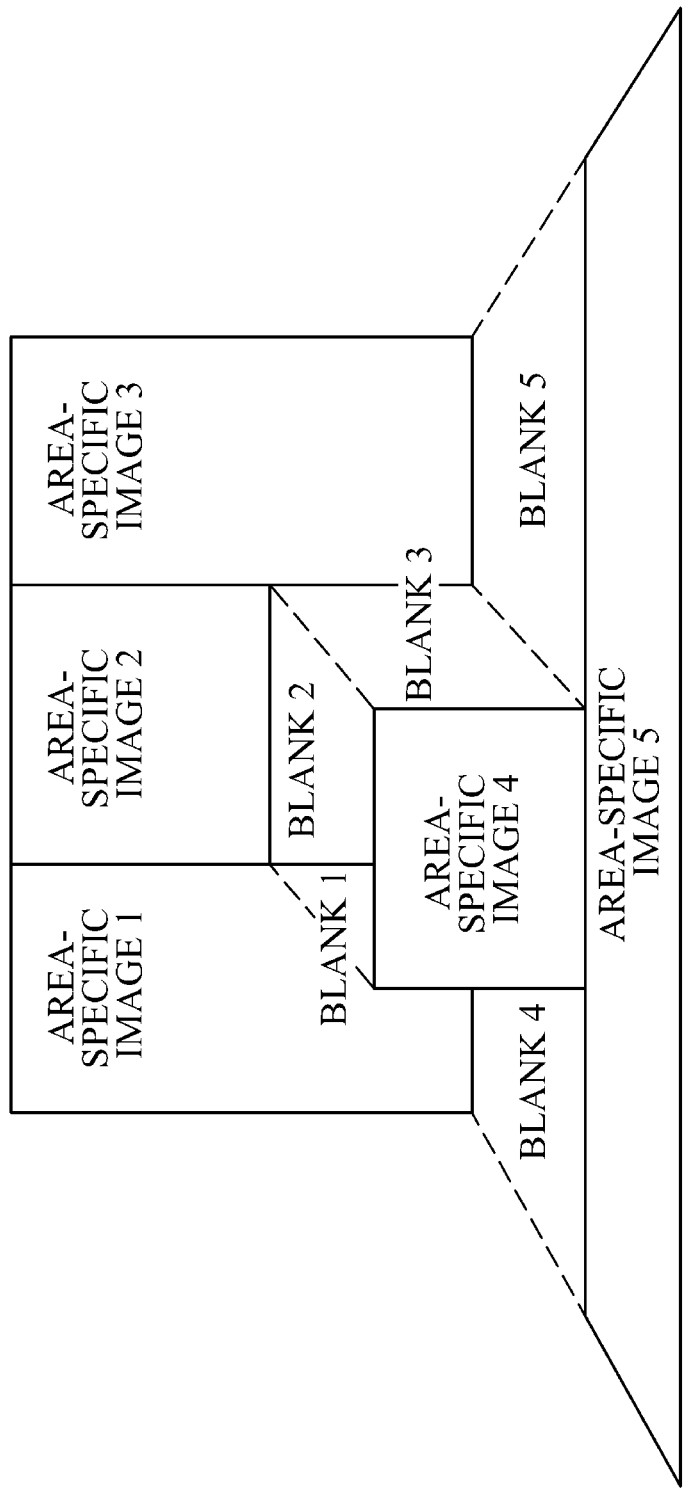
FIG. 3 illustrates an example of a screen obtained by rotating the screen of FIG. 2 in which area-specific images are arranged in a 3D space.

FIG. 3 illustrates an example of a screen obtained by rotating the screen of FIG. 2 in which area-specific images are arranged in a 3D space. In FIG. 3, blanks 1, 2, 3, 4, and 5 are included between area-specific images 1, 2, 3, 4, and 5.

To generate a 3D image, the image corrector 160 performs image correction for the boundaries of the area-specific images arranged in the 3D space using the above-described methods.

Referring to FIG. 1, the terminal 100 having an image conversion function may additionally include a rendering processor 170. The rendering processor 170 performs rendering so that the area-specific images arranged in the 3D space by the image processor 150 includes perspective. Rendering provides a color or effect to each surface of a 3D object.

The terminal 100 having an image conversion function may relate the area-specific images to global positioning system (GPS) information of the terminal 100 and/or longitude and latitude information of the area-specific images.

If the area-specific images are related to GPS information of the terminal 100 having an image conversion function and/or longitude and latitude information of the area-specific images in addition to the distance information of the area-specific images, the GPS information of the terminal 100 and/or information on an object corresponding to the longitude and latitude information of the area-specific images, for example, an image of the actual object, may be obtained from a map information database.

For example, during image correction by the image corrector 160, GPS information of the terminal 100 and/or an image of an actual object corresponding to longitude and latitude information of the corresponding area-specific image are searched for from a server, and a part of the searched image is copied to fill a blank, thereby correcting the image.

Meanwhile, the terminal 100 having an image conversion function may relate the area-specific images to user input information. For example, if the area-specific images are related to user input information as well as distance information and the user input information is displayed when the image processor 150 arranges and displays the area-specific images in the 3D space, it is possible to record and provide information on the area-specific images, so that a customized 3D image may be displayed.

Meanwhile, in the terminal 100 having an image conversion function, the image processor 150 may additionally perform a zoom-in or zoom-out operation for the area-specific images arranged and displayed in the 3D space according to a user input.

For example, according to a user's input of a zoom-in or zoom-out instruction for a specific area-specific image, the image processor 150 performs the zoom-in or zoom-out operation for the area-specific image, so that area-specific images arranged and displayed in a 3D space may be controlled by the user.

Figure 4:
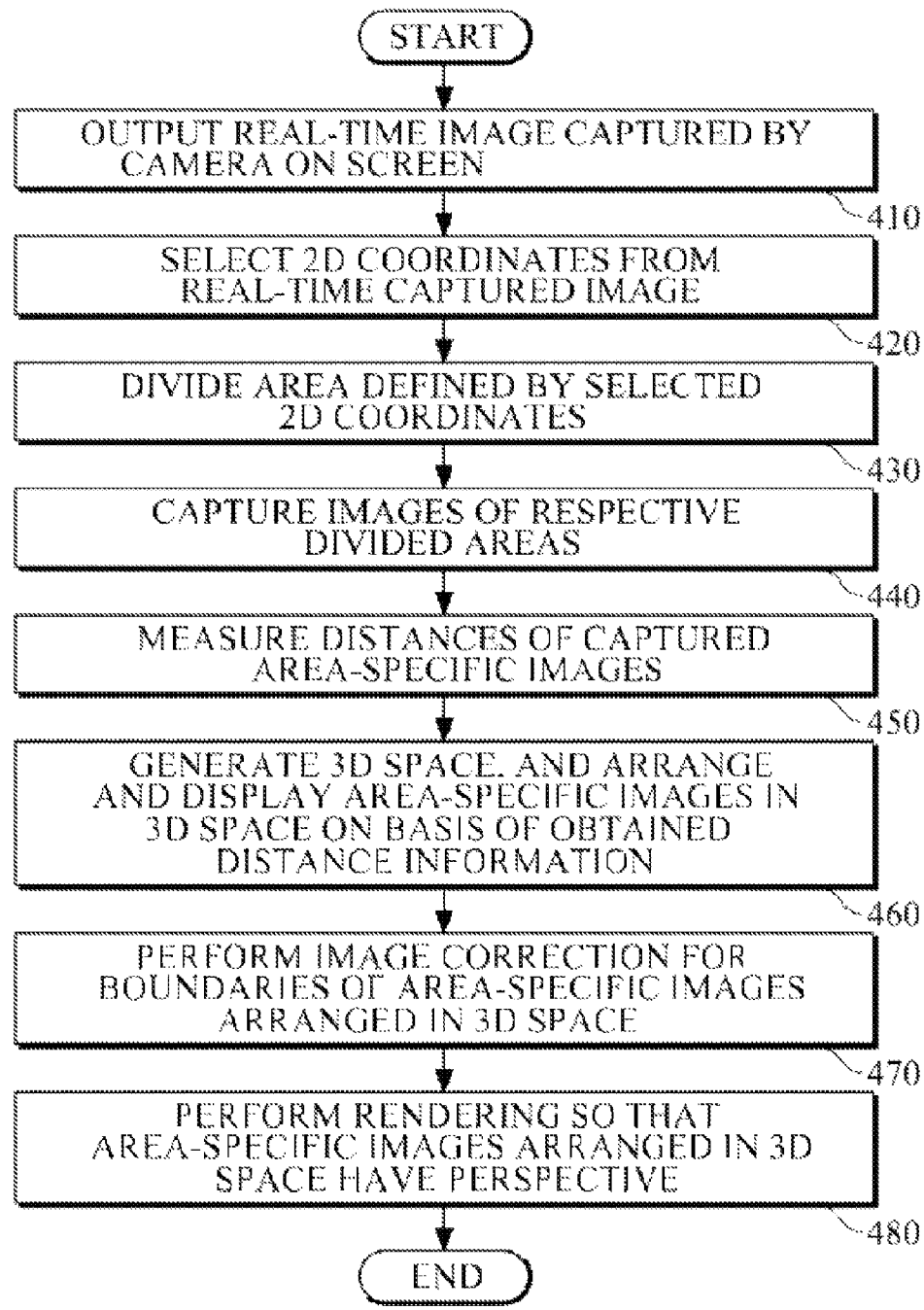
FIG. 4 illustrates a method for image conversion according to an exemplary embodiment.

An image conversion operation of a terminal having an image conversion function according to an exemplary embodiment will be briefly described with reference to FIG. 4. FIG. 4 illustrates a method for image conversion according to an exemplary embodiment.

If a terminal having an image conversion function enters an image conversion capturing mode, such as automatically upon certain conditions or by a user's manipulation, the terminal outputs a real-time image captured by a camera on a screen in operation 410.

In operation 420, the terminal having an image conversion function selects 2D coordinates from the real-time captured image.

If 2D coordinates are selected in operation 420, the terminal having an image conversion function divides an area defined by the selected 2D coordinates in operation 430.

If the real-time captured image is divided in operation 430, the terminal having an image conversion function captures images of the respective divided areas in operation 440.

If the area-specific images are captured in operation 440, distances of the captured area-specific images are measured in operation 450.

In operation 460, the terminal having an image conversion function generates a 3D space and arranges and displays the area-specific images in the 3D space on the basis of the distance information obtained in operation 450. However, the displaying the area-specific images in 3D space may be performed separately from or not performed with respect to operation 460.

In operation 470, the terminal having an image conversion function performs image correction for the boundaries of the area-specific images arranged in the 3D space in operation 460. Operation 470 may further include displaying the arranged and corrected area-specific images but aspects are not limited thereto.

In operation 480, the terminal having an image conversion function performs rendering so that the area-specific images arranged in the 3D space can have perspective. Operation 480 may include displaying the arranged and rendered area-specific images or displaying the arranged, corrected, and rendered area-specific images but aspects are not limited thereto.

Thus, the terminal having an image conversion function arranges and displays the area-specific images in the 3D space on the basis of the distance information of the area-specific images obtained by dividing the 2D image.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal, comprising:
a coordinate selector to select two-dimensional (2D) coordinates from an image;
an area divider to divide an area defined by the 2D coordinates selected by the coordinate selector;
an image capturer to capture an area-specific image of the area divided by the area divider;
a distance measurer to measure a distance of the area-specific image captured by the image capturer from the terminal; and
an image processor to generate a three-dimensional (3D) space, and to arrange and to display the captured area-specific image in the 3D space on the basis of the distance obtained by the distance measurer.

2. The terminal of claim 1, further comprising:
an image corrector to perform image correction for boundaries of the area-specific image arranged in the 3D space by the image processor.

3. The terminal of claim 2, further comprising:
a rendering processor to perform rendering of the area-specific image arranged in the 3D space by the image processor.

4. The terminal of claim 1, wherein the coordinate selector selects 2D coordinates spaced apart from each other by a same distance in horizontal and vertical directions from a point within the image.

5. The terminal of claim 1, wherein the coordinate selector selects the 2D coordinates according to an input.

6. The terminal of claim 1, wherein the coordinate selector recognizes an object in the image, and selects 2D coordinates among 2D coordinates of an area including the recognized object.

7. The terminal of claim 1, wherein the image capturer focuses on center coordinates of the area-specific image to capture the area-specific image.

8. The terminal of claim 1, wherein the image processor modifies and arranges the area-specific image in the 3D space on the basis of the distance of the area-specific image.

9. The terminal of claim 8, wherein the modification of the area-specific image comprises at least one of enlargement, reduction, rotation, and bending of the area-specific images.

10. The terminal of claim 1, wherein the area-specific image is related to global positioning system (GPS) information of the terminal and longitude and latitude information of the area-specific images.

11. The terminal of claim 1, wherein the area-specific image is related to user input information.

12. The terminal of claim 2, wherein the image corrector performs image correction by copying a part of images adjacent to a blank at a boundary generated by arranging the area-specific image in the 3D space on the basis of the distance to fill the blank.

13. The terminal of claim 2, wherein the image corrector performs image correction by copying a part of images symmetrical to a blank at a boundary generated by arranging the area-specific image in the 3D space on the basis of the distance to fill the blank.

14. The terminal of claim 2, wherein the image corrector performs image correction by enlarging an area-specific image positioned in an area corresponding to a blank at a boundary generated by arranging the area-specific image in the 3D space on the basis of the distance to fill the blank.

15. The terminal of claim 2, wherein the image corrector performs image correction by searching for an image corresponding to global positioning system (GPS) information related to an area-specific image corresponding to a blank at a boundary generated by arranging the area-specific images in the 3D space on the basis of the distance from a server and copying a part of the searched image to fill the blank.

16. The terminal of claim 1, wherein the image processor performs a zoom-in or zoom-out operation for the area-specific image arranged and displayed in the 3D space.

17. A computer-implemented method for image conversion, the method comprising:
selecting two-dimensional (2D) coordinates from a 2D image;
dividing, with the computer, an area defined by the 2D coordinates;
capturing an area-specific image of the divided area;
measuring a distance of the area-specific image from a terminal;
arranging, with the computer, the area-specific image in a generated three-dimensional (3D) space on the basis of the measured distance of the area-specific image; and
displaying, with the computer, the arranged area-specific image on a screen.

18. The method of claim 17, further comprising:
correcting boundaries of the area-specific image arranged in the 3D space.

19. A computer-implemented method for image conversion, the method comprising:
selecting two-dimensional (2D) coordinates from a 2D image;
dividing, with the computer, an area defined by the 2D coordinates into an area-specific image;
measuring a distance of the area-specific image;
arranging, with the computer, the area-specific image in a three-dimensional (3D) space on the basis of the distance of the area-specific image; and
displaying, with the computer, the arranged area-specific image on a screen; and
correcting, with the computer, boundaries of the area-specific image arranged in the 3D space,
wherein the correcting comprises copying a part of images adjacent to a blank at a boundary generated by arranging the area-specific image in the 3D space on the basis of the distance to fill the blank.

20. The method of claim 19, wherein the correcting comprises copying a part of images symmetrical to a blank at a boundary generated by arranging the area-specific image in the 3D space on the basis of the distance to fill the blank.

21. The method of claim 19, wherein the correcting comprises enlarging an area-specific image positioned in an area corresponding to a blank at a boundary generated by arranging the area-specific image in the 3D space on the basis of the distance to fill the blank.

22. The method of claim 19, wherein the correcting comprises searching for an image corresponding to global positioning system (GPS) information related to an area-specific image corresponding to a blank at a boundary generated by arranging the area-specific image in the 3D space on the basis of the distance from a server and copying a part of the searched image to fill the blank.

23. A computer-implemented method for image conversion, the method comprising:
dividing, with the computer, a two-dimensional (2D) image into areas;
capturing area-specific images of the divided areas;
measuring a distance to an object in at least one of the area-specific images; and
arranging, with the computer, the area-specific images in a generated three-dimensional (3D) space on the basis of the measured distance of the object in the at least one of the area-specific images.

24. The terminal of claim 1, wherein the coordinate selector automatically selects the two-dimensional (2D) coordinates from the image.

25. The method of claim 17, wherein the selecting comprises automatically selecting the 2D coordinates from the 2D image.

* * * * *